United States Patent [19]

Yamashita et al.

[11] Patent Number: 5,655,373
[45] Date of Patent: Aug. 12, 1997

[54] GAS TURBINE INTAKE AIR COOLING APPARATUS

[75] Inventors: Katsuya Yamashita, Tokyo; Hiroki Simaya, Himeji, both of Japan

[73] Assignee: Kabushiki Kaisha Toshiba, Kawasaki, Japan

[21] Appl. No.: 535,891

[22] Filed: Sep. 28, 1995

[30] Foreign Application Priority Data

Sep. 28, 1994 [JP] Japan .................... 6-233519
Aug. 10, 1995 [JP] Japan .................... 7-204431

[51] Int. Cl.⁶ .................................. F02C 7/143
[52] U.S. Cl. .................................. 60/728
[58] Field of Search .................. 60/39.02, 39.182, 60/728; 415/177, 179

[56] References Cited

U.S. PATENT DOCUMENTS

3,788,066  1/1974  Nebgen ................. 60/728
3,796,045  3/1974  Foster-Pegg ........... 60/728
4,418,527  12/1983 Schlom et al. .......... 60/728
5,321,944  6/1994  Bronicki et al. ........ 60/728

Primary Examiner—Louis J. Casaregola
Attorney, Agent, or Firm—Oblon, Spivak, McClelland, Maier & Neustadt, P.C.

[57] ABSTRACT

Water is flowed down into heat transfer tubes from their inlet ports to form flowing water films. The flowing water is evaporated from the flowing water films, thereby cooling combustion air of a gas turbine that flows in the channel. Water vapor generated in the heat transfer tubes is absorbed by an absorber by using an aqueous lithium bromide solution. Water vapor contained in the aqueous solution supplied from the absorber is extracted. The extracted water vapor is condensed to water by a condenser through which cooling water flows. The obtained water is supplied to the water tank. A condensed aqueous solution from which the water vapor has been removed by the generator is supplied to the absorber.

6 Claims, 5 Drawing Sheets

GAS TURBINE INTAKE AIR COOLING APPARATUS

BACKGROUND OF THE INVENTION

1. Field of the Invention

The present invention relates to a gas turbine intake air cooling apparatus and, more particularly, to a gas turbine intake air cooling apparatus utilized for increasing the output of the gas turbine facilities of a combined cycle power plant.

2. Description of the Related Art

In recent years, thermal power plant facilities are being shifted to combined cycle power plants having an improved thermal efficiency in order to renew old single cycle power plants.

Different from a single cycle power plant, a combined cycle power plant has a gas turbine in place of a conventional boiler, and generates electric power with a generator driven by this gas turbine and a generator driven by a steam turbine that receives steam from a waste heat boiler utilizing exhaust gas of the gas turbine. The efficiency of the combined cycle power plant is improved over that of the single cycle power plant by about 10%.

The gas turbine used in the combined cycle power plant generates a high-temperature high-pressure gas by causing combustion of compressed air with fuel, and rotates the turbine with this gas, thereby obtaining power.

An output from the gas turbine is influenced by the temperature and humidity of the combustion air. More specifically, the output from the gas turbine is related to the amount of oxygen (amount of air) that can be taken. The larger the amount of intake air and the lower the air temperature, the higher the output from the gas turbine.

The larger the moisture content in air, the larger the amount of water vapor in the high-temperature high-pressure gas. Latent heat of the water vapor, after being cooled by the waste heat boiler, is not used but is discharged to the outside. Thus, the smaller the moisture content (humidity) in intake air, the higher the output of the combined cycle power generation.

Accordingly, the output performance of the combined cycle power plant differs between summer and winter. In particular, as the power demand reaches the peak in the daytime of summer, a decrease in output of the combined cycle power generation poses a serious problem.

A freon-free absorption type refrigerating machine or HP (Heat Pump) attracts attention as freon destroys the ozone layer. As this absorption type refrigerating machine does not use electricity as the drive source but can utilize steam and exhaust gas, it is promising as a device for leveling the power load of summer.

A currently proposed gas turbine air cooling apparatus utilizes latent heat of ice. This apparatus stores cold heat by an electric refrigerating machine in the form of ice at night when the power demand is low, extracts this cold heat during the daytime power peak hours, and cools the intake air of the gas turbine with the cold heat.

More specifically, the refrigerating machine is operated at night by using seawater or the like as the cooling water. Ice is stored in an ice storage tank. This ice is thawed during the daytime peak hours, and supplied in the form of cold water to an air-cooling heat transfer (air cooler) installed to the intake channel, thereby cooling the intake air of the gas turbine.

However, in the ice storage tank of the gas turbine intake air cooling apparatus described above, the ice must be thawed at a high speed. Also, since the intake temperature must be decreased, the temperature of the water returning from the air cooler cannot be increased too much. Then, the following problems arise.

In the conventional gas turbine intake air cooling apparatus, as ice making is performed between night and the daytime peak hours and the obtained cold heat is extracted within 2 to 4 hours during the daytime peak hours, the amount of cold water circulating between the ice storage tank and the air cooler is very large, which is about 4 to 6 times that of a conventional air-conditioning large-size ice storage system.

When the flow rate of circulating cold water is increased, the residence time of the return water in the ice storage tank becomes short. As the cold water is circulated before the ice in it is sufficiently thawed, the intake temperature of the cold water is increased. Even if the ice storage tank stores ice, the intake air cannot be cooled to a predetermined temperature.

The gas turbine intake air cooling apparatus described above has a problem in the amount of ice in the ice storage tank. When the amount of ice is small, the size of the ice storage tank itself is increased.

Moreover, other major large-size constituent equipments are a refrigerating machine and a air-cooler. Therefore, it is difficult to put a gas turbine intake air cooling apparatus into a practical use in terms of cost and space.

SUMMARY OF THE INVENTION

The present invention has been made in view of the above situation, and has as its object to provide a gas turbine intake air cooling apparatus in which the pressure loss of the combustion air of the gas turbine can be decreased and the cost and space can be decreased.

According to the first aspect of the present invention, there is provided a gas turbine intake air cooling apparatus comprising: a plurality of heat transfer tubes, which are arranged midway along one of two channels which are branched and arranged between a gas turbine and an air supply source for supplying combustion air to the gas turbine and through which the combustion air of the gas turbine flows, to be perpendicular to the channel, through which water flows down from inlet ports thereof to form flowing water films, and in which flowing water is evaporated from the flowing water films, thereby cooling the combustion air of the gas turbine that flows in the channel; an absorber, arranged above the heat transfer tubes, for absorbing water vapor generated in the heat transfer tubes by using an aqueous lithium bromide solution; a water tank, provided to outlet port sides of the heat transfer tubes, for storing water flowing from the heat transfer tubes; pumping means for pumping water stored in the water tank up to the inlet port sides of the heat transfer tubes; and a generator for extracting the water vapor contained in the aqueous lithium bromide solution supplied from the absorber, condensing the extracted water vapor to water by a condenser through which cooling water flows, supplying the obtained water to the water tank, and supplying a condensed aqueous lithium bromide solution from which the water vapor has been removed to the absorber.

According to the second aspect of the present invention, there is provided a gas turbine intake air cooling apparatus comprising: a plurality of cooling plates, which are arranged midway along one of two channels which are branched and arranged between a gas turbine and an air supply source for supplying combustion air to the gas turbine and through which the combustion air of the gas turbine flows, at predetermined gaps to be substantially parallel to a flowing direction of the combustion air of the gas turbine that flows in the channel, each of the plurality of cooling plates forming a hollow portion therein with two flat plates so that water flows down in the hollow portion from inlet ports to form flowing water films, and in which the flowing water is evaporated from the flowing water films, thereby cooling the combustion air of the gas turbine that flows in the channel; an absorber, arranged above the cooling plates, for absorbing water vapor generated in the cooling plates by using an aqueous lithium bromide solution; a water tank, provided to outlet port sides of the cooling plates, for storing water flowing from the cooling plates; pumping means for pumping water stored in the water tank up to the inlet port sides of the cooling plates; and a generator for extracting the water vapor contained in the aqueous lithium bromide solution supplied from the absorber, condensing the extracted water vapor to water by a condenser through which cooling water flows, supplying the obtained water to the water tank, and supplying a condensed aqueous lithium bromide solution from which the water vapor has been removed to the absorber.

Therefore, according to the gas turbine intake air cooling apparatus of the present invention, the pressure loss of the combustion air of the gas turbine can be decreased, and the cost and space can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

<First Embodiment>

A gas turbine intake air cooling apparatus according to the first embodiment of the present invention will be described with reference to the accompanying drawings. First, this apparatus will be generally described.

To cool a large amount of intake air within 2 to 3 hours of the daytime power load peak hours of summer, the sensible heat (1 kcal/kg) of water and the melting heat of ice (80 kcal/kg) satisfy only about 30% of the required total heat even if the amount of ice (ice filling rate: the rate in weight of ice to water) is increased. Even if the sensible heat of return water (return temperature: 12° C.) can also be utilized, a considerably large ice storage tank is necessary.

In contrast to this, if the evaporation latent heat (597 kcal/kg) of water can be utilized, the intake air can be cooled with a small amount of water. More specifically, when this evaporation latent heat is compared with the amount of cold heat per unit mass of an ice storage tank having an ice filling rate of 30%, $597/(0.31 \times 80 + 12) = 16.58$ is obtained. Thus, the intake air can be cooled with a sufficiently small mass (water amount).

To cool the intake air, water is evaporated at a high vacuum as the water has an evaporation temperature of about 5° C.

Accordingly, in order to cool a large amount of intake air while suppressing the pressure loss, the gas turbine air cooling apparatus of this embodiment employs a flowing liquid film evaporation scheme in which water is evaporated while being caused to fall in vertical heat transfer tubes.

To evaporate water at a low temperature, a large vacuum pump is used, or a condensed aqueous lithium bromide solution is cooled with seawater to absorb water vapor. To operate the vacuum pump by using electricity during the power load peak hours is to mistake the means for the end. In addition, it is possible to sufficiently condense the aqueous lithium bromide solution by utilizing exhaust gas before the gas is exhausted from the waste heat recovery heat exchanger. Thus, the gas turbine air cooling apparatus of the present invention utilizes the condensed aqueous lithium bromide solution.

Water vapor is condensed to water by a condenser (utilizing seawater) provided above the generator, and the obtained water is returned to a water tank provided under a heat transfer tube group used for vertical flowing liquid film evaporation.

Figure 1:
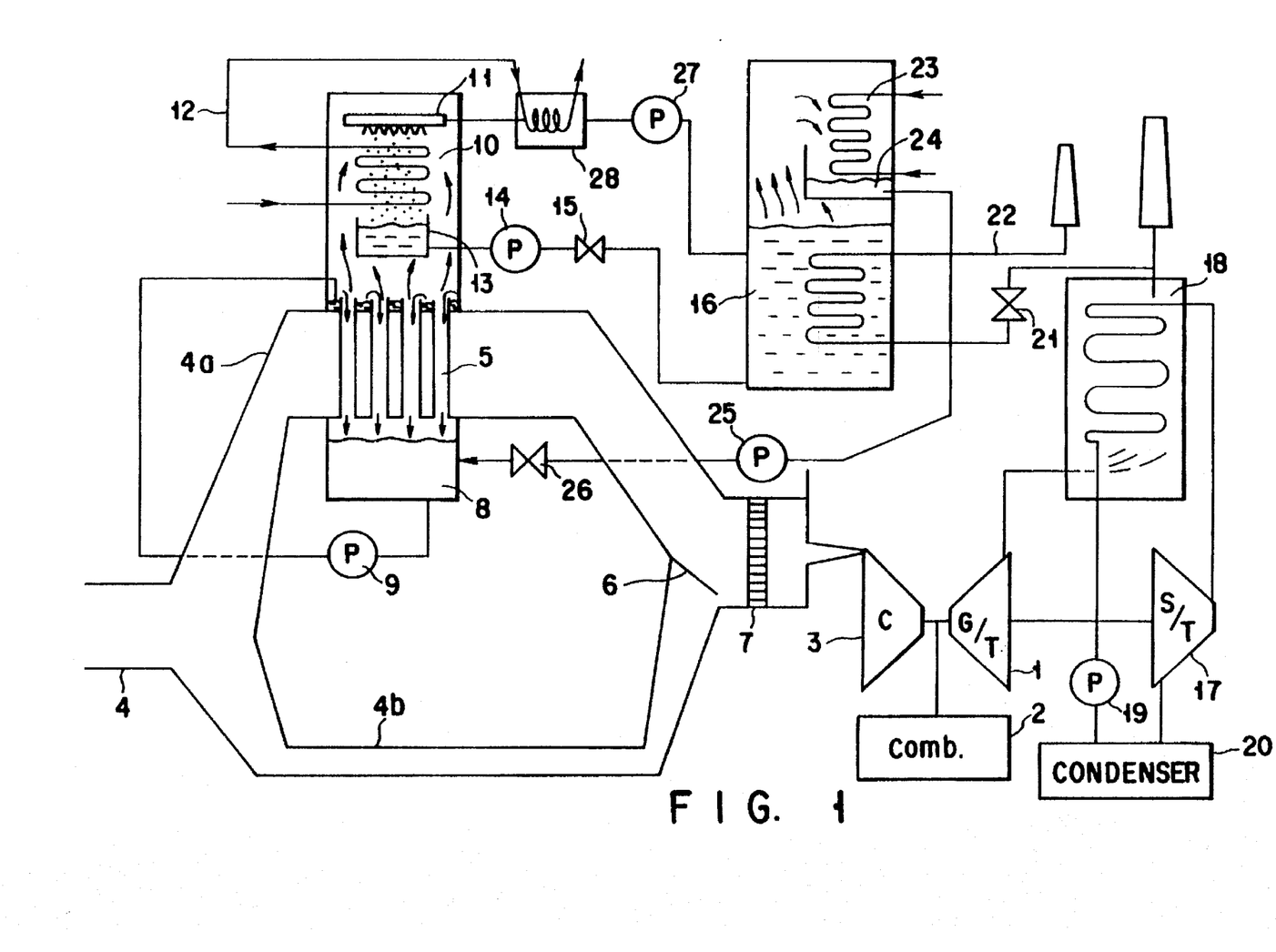
FIG. 1 is a diagram showing the arrangement of a gas turbine intake air cooling apparatus according to the first embodiment of the present invention.

FIG. 1 shows the arrangement of the gas turbine intake air cooling apparatus according to the first embodiment of the present invention.

As shown in FIG. 1, a combustor 2 and an intake compressor 3 are provided to the intake side of a gas turbine 1.

An intake channel 4 for flowing combustion air to the gas turbine 1 is provided to the inlet side of the intake compressor 3. The intake channel 4 is branched into two intake channels 4a and 4b.

An air cooler 5 is provided midway along the intake channel 4a to be perpendicular to the channel.

During the daytime power load peak hours, the intake channel 4a provided with the air cooler 5 is used. During the nighttime off-peak hours, the intake channel 4b is used.

Selection between the intake channels 4a and 4b is performed by a channel switching damper 6 provided to the merge portion of the intake channels 4a and 4b. A filter 7 for catching dust and waterdrops in the intake air is provided at the merge portion of the intake channels 4a and 4b.

The air cooler 5 is constituted by a plurality of heat transfer tubes that are arranged perpendicularly to the intake channel 4a. Water is caused to flow down from the inlet ports of the heat transfer tubes into tubes, and is evaporated from the flowing water films, thereby cooling the gas turbine combustion air flowing in the intake channel 4a.

A water tank 8 for storing water flowing from the heat transfer tubes is provided to the outlet sides of the heat transfer tubes. A pump 9 for pumping up water stored in the water tank 8 up to the inlet port sides of the heat transfer tubes is connected to the water tank 8 through a pipe.

An absorber 10 is provided to the inlet port sides of the heat transfer tubes constituting the air cooler 5.

A sprinkler 11 for sprinkling a condensed aqueous lithium bromide solution is provided above the absorber 10.

A horizontal heat transfer tube 12 for flowing seawater therethrough is arranged below the sprinkler 11. The horizontal heat transfer tube 12 cools the condensed aqueous lithium bromide solution which has been sprinkled, thereby absorbing water vapor of the horizontal heat transfer tube 5.

A diluted aqueous lithium bromide solution tank 13 is provided below the horizontal heat transfer tube 12 in order to store the diluted aqueous lithium bromide solution flowing down through the horizontal heat transfer tube 12 to absorb water vapor.

The diluted aqueous lithium bromide solution tank 13 is connected to a generator 16 through a pump 14 and a valve 15.

A steam turbine 17 and a waste heat recovery heat exchanger (HRGS) 18 are connected to the output side of the gas turbine 1. The waste heat recovery heat exchanger 18 is connected to a condenser 20 with pipes through a pump 19. The condenser 20 is also connected to the steam turbine 17.

The waste heat recovery heat exchanger 18 is also connected, through a valve 21, to a horizontal heat transfer tube 22, arranged in the condensed aqueous lithium bromide solution in the generator 16.

A condenser 23 through which seawater flows is provided at the upper portion of the generator 16. A water reservoir portion 24 for storing water condensed by the condenser 23 from water vapor is provided below the condenser 23.

The water reservoir portion 24 is connected to the water tank 8 with pipes through a pump 25 and a valve 26.

The generator 16 is connected to the sprinkler 11 with pipes through a pump 27. A pre-cooler 28 that uses seawater in the horizontal heat transfer tube 12 is provided midway along the pipe between the generator 16 and the sprinkler 11.

Figure 2A:
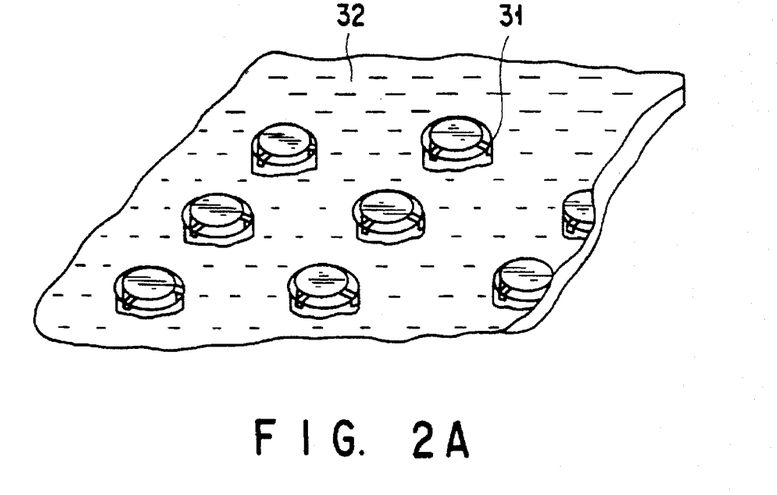
FIGS. 2A to 2C are views showing in detail the air cooler of the gas turbine intake air cooling apparatus according to the first embodiment of the present invention.
Figures 2B, 2C:
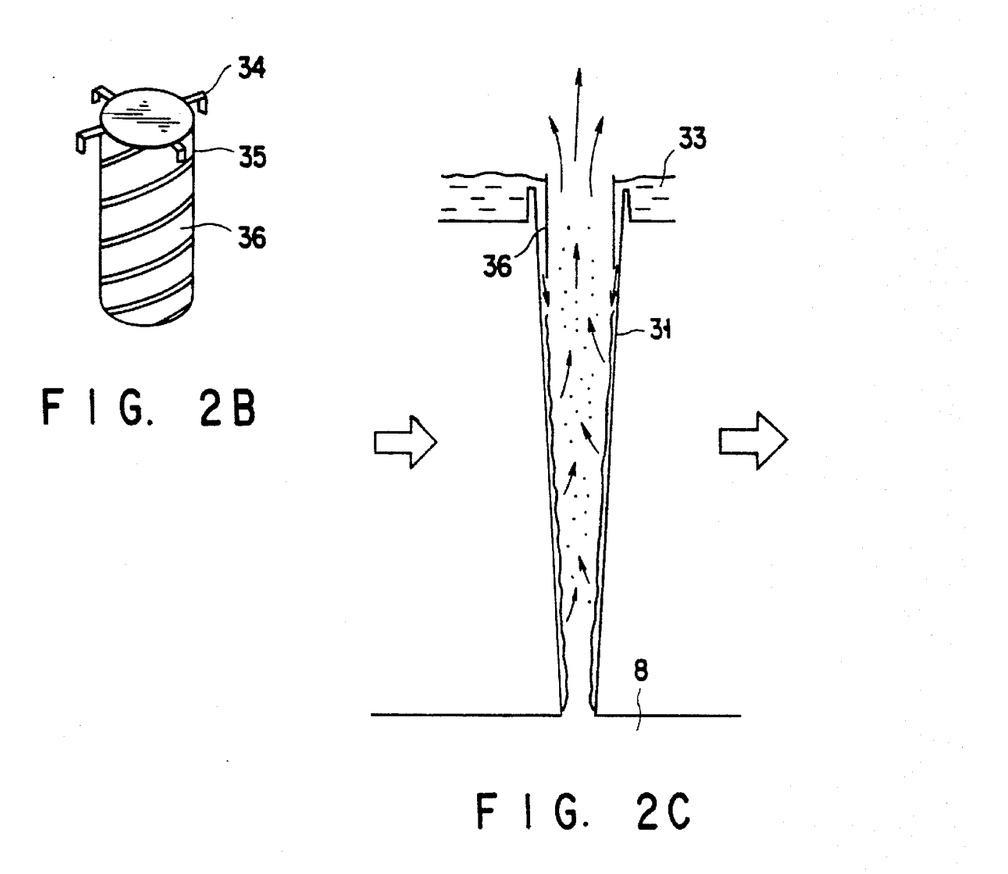

FIGS. 2A to 2C show the air cooler 5 in detail.

FIG. 2A is a plan view of a plurality of heat transfer tubes 31, FIG. 2B is a view showing the outer appearance and arrangement of a water distributor 36 mounted to the upper portion of each heat transfer tube 31, and FIG. 2C is a sectional view of the heat transfer tube 31.

As shown in FIG. 2C, each heat transfer tube 31 arranged perpendicularly to the intake channel 4a is widened toward the upper end. More specifically, the sectional area of the heat transfer tube 31 is gradually decreased from its inlet side toward the outlet side. To supply water 32 to this heat transfer tube 31, the heat transfer tube 31 is set to project above the upper wall of the inlet channel so as to constitute a shallow liquid reservoir (water reservoir) 33, and only water 32 overflowing from the projecting portion is flowed down into the heat transfer tube 31.

Each heat transfer tube 31 has water distributor fixing stays 34 at its upper portion. The cylindrical water distributor 36 having helical projections 35 on its outer side is provided at the uppermost portion of the heat transfer tube 31. Thus, a uniform flowing liquid film (water film) can be formed.

Figure 3A:
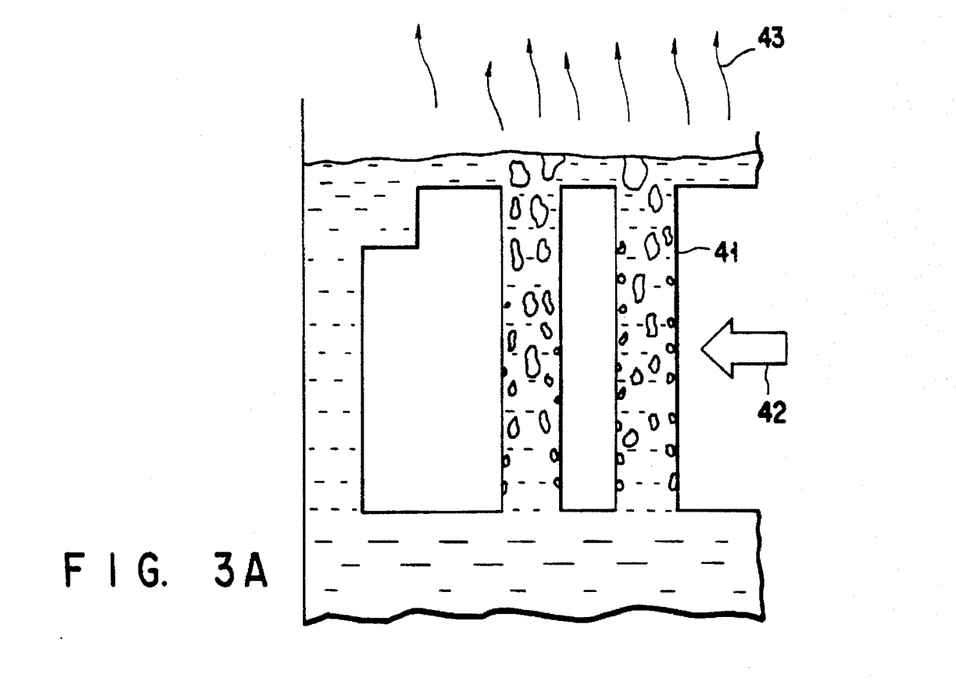
FIGS. 3A and 3B are diagrams showing in detail the generator of the gas turbine intake air cooling apparatus according to the first embodiment of the present invention.
Figure 3B:
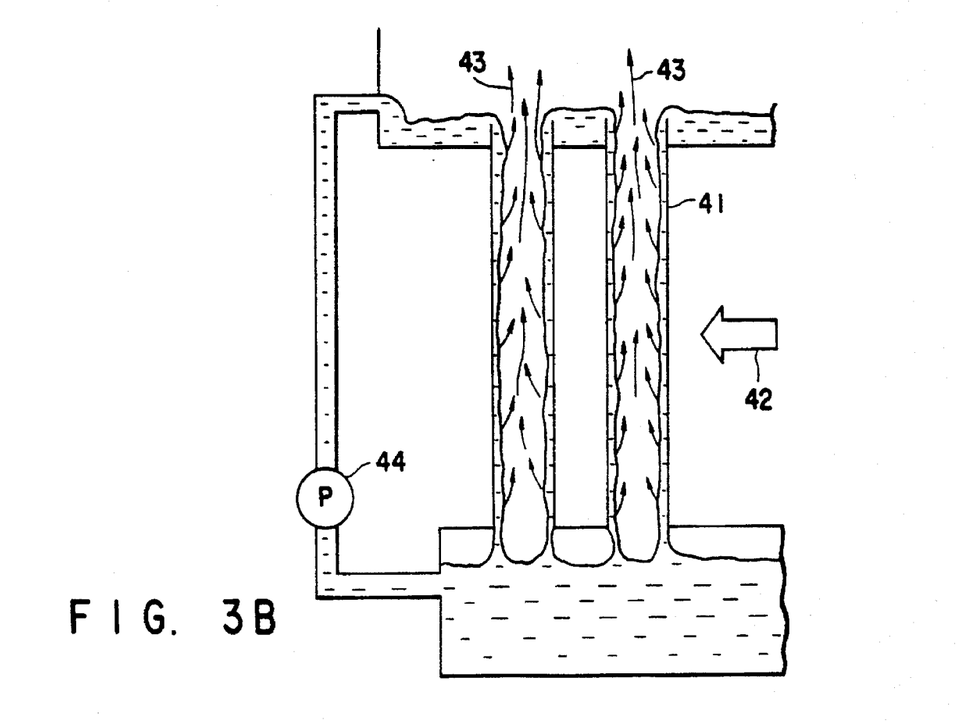

FIGS. 3A and 3B show the generator 16 in detail.

As shown in FIG. 3A, when the temperature of the exhaust gas from the waste heat recovery heat exchanger 18 is as high as 120° C. or more, steam generating heat transfer tubes 41 are set lower than the liquid level of the aqueous lithium bromide solution, and are heated by heat from an exhaust gas 42. Thus, bubble (steam) pumps are constituted to generate steam 43.

As shown in FIG. 3B, when the temperature of the exhaust gas 42 is low, the levels of the heat transfer tubes 41 are set higher than the liquid level of the aqueous lithium bromide solution. The aqueous lithium bromide solution is pumped up by an aqueous lithium bromide solution circulating pump 44, and flowing liquid films are formed in the heat transfer tubes 41, so that the steam 43 is generated with a comparatively low temperature difference.

The operation of the gas turbine intake air cooling apparatus according to the first embodiment of the present invention will be described.

Water stored in the water tank 8 is pumped up by the pump 9 and supplied to the inlet port sides of the heat exchanger tubes 31.

The pumped water flows down from the inlet ports of the heat transfer tubes 31 to form flowing water films. The falling water is evaporated from the flowing water films, thereby cooling the gas turbine combustion air flowing in the channel.

Vapor generated by the heat transfer tubes 31 is absorbed by the aqueous lithium bromide solution which has been sprinkled by the sprinkler 11 and cooled through the horizontal heat transfer tube 12 through which seawater flows.

The aqueous lithium bromide solution that has absorbed water vapor is stored in the diluted aqueous lithium bromide solution tank 13.

The aqueous lithium bromide solution stored in the diluted aqueous lithium bromide solution tank 13 is supplied to the generator 16 by the pump 14.

Water vapor contained in the aqueous lithium bromide solution supplied to the generator 16 is evaporated, during the nighttime off-peak hours, by using the exhaust gas generated from the gas turbine 1.

Evaporated water vapor is condensed to water by the condenser 23 through which seawater flows, and the obtained water is stored in the water reservoir portion 24.

Water stored in the water reservoir portion 24 is supplied to the water tank 8 by the pump 25 (or a head (pressure difference)).

The condensed aqueous lithium bromide solution is cooled by the pre-cooler 28, supplied to the sprinkler 11 by the pump 27 during the daytime peak hours, and sprinkled.

Therefore, according to the gas turbine inlet air cooling apparatus of this embodiment, the intake air of the gas turbine can be cooled by only the aqueous lithium bromide solution and the power of the water pump, so that the output from the combined cycle power plant can be increased during the daytime power load peak hours of summer.

In the intake channel of the gas turbine, water is stably evaporated at a high vacuum by evaporation of the liquid films flowing down in the vertical heat transfer tube group, and the intake air is cooled with a high cooling performance of water evaporation. Thus, the air cooler provided in the intake channel can be made compact.

As the drive source to generate water vapor, the condensed aqueous lithium bromide solution is cooled by seawater, and the aqueous lithium bromide solution is condensed by utilizing the exhaust gas of the waste heat recovery heat exchanger during nighttime. Thus, a non-utilized energy can be utilized effectively.

The flowing liquid film for cooling the intake air has a higher thermal conductivity than water flowing in the heat transfer tubes and can maintain the cooling wall surface to a predetermined temperature in accordance with the evaporation temperature. Thus, the air cooler itself can be made small, thereby decreasing the pressure loss occurring when the intake air is cooled with air.

Seawater is used for pre-cooling the condensed aqueous lithium bromide solution, and evaporation by the generator employs the flowing liquid film scheme in accordance with the temperature of the exhaust gas heating source. Thus, heat exchange and material exchange can be performed efficiently.

As the group of the vertical tubes provided to the intake channel are upwardly widened tubes, water vapor can be smoothly generated in the vertically upward direction.

When the temperature of the exhaust gas from the waste heat recovery heat exchanger 18 is low, flowing liquid films are formed in the generator 16 outside the heat transfer tube through which the exhaust gas flows by the aqueous lithium bromide solution circulating pump, so that steam can be generated efficiently.

<Second Embodiment>

A gas turbine air cooling apparatus according to the second embodiment of the present invention will be described.

The gas turbine intake air cooling apparatus of the second embodiment is different from that of the first embodiment in the structure of an intake air cooler arranged midway along an intake channel 4a.

Figures 4, 5A, 5B, 6, 7:
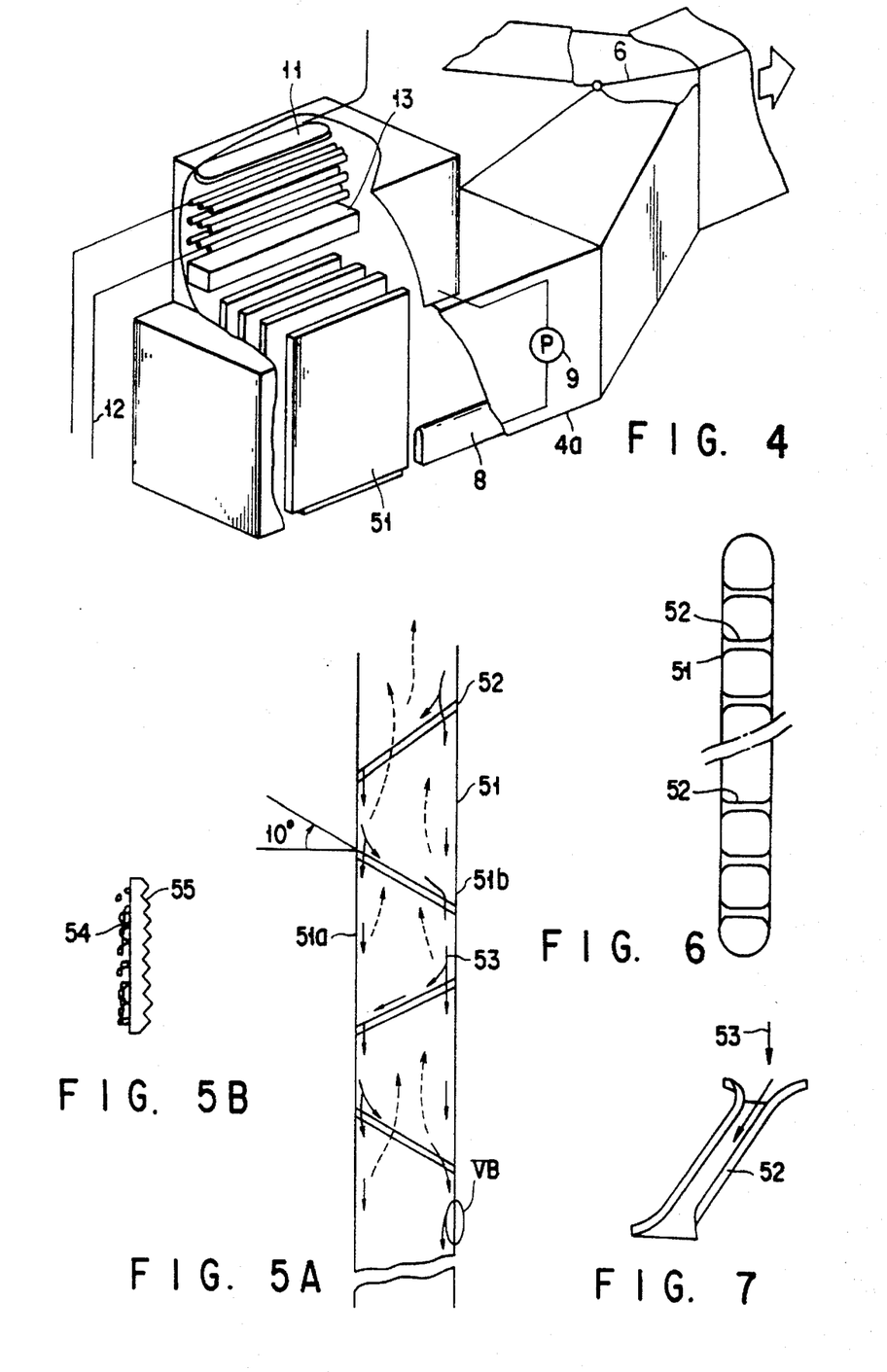
FIG. 4 is a perspective view showing the arrangement of the air cooler of a gas turbine intake air cooling apparatus according to the second embodiment of the present invention.
FIGS. 5A and 5B are vertically sectional views of a vertical cooling plate of the gas turbine intake air cooling apparatus according to the second embodiment of the present invention.
FIG. 6 is a horizontally sectional view of the vertical cooling plate of the gas turbine intake air cooling apparatus according to the second embodiment of the present invention.
FIG. 7 is a view showing the arrangement of the gutter-type beam of the gas turbine intake air cooling apparatus according to the second embodiment of the present invention.

FIG. 4 is a perspective view showing the arrangement of the air cooler of the gas turbine intake air cooling apparatus according to the second embodiment of the present invention. In FIG. 4, portions identical to those of FIG. 1 are denoted by the same reference numerals.

The characteristic feature of the intake air cooler of the second embodiment resides in that vertical cooling plates 51 are vertically disposed at predetermined gaps in an intake duct constituting the intake channel 4a.

As described in the above first embodiment, a water tank 8 is provided for storing water flowing from the vertical cooling plates 51. The water tank 8 is connected to a pump 9 for pumping the stored water up to the inlet port sides of the vertical cooling plates 51.

An absorber 10 is provided above the vertical cooling plates 51. When seawater is flowed in a horizontal heat exchanger tube 12, the absorber 10 cools the condensed aqueous lithium bromide solution sprinkled by a sprinkler 11, thereby absorbing water vapor from the vertical cooling plates 51.

FIG. 5 is a vertically sectional view of a vertical cooling plate 51, and FIG. 6 is a horizontally sectional view of the same.

As shown in FIGS. 5A, 5B and 6, each vertical cooling plate 51 is constituted by sandwiching, between two flat plates 51a and 51b, a plurality of oblique gutter type beams 52 that are inclined by 10° or more with respect to the plate surface of the flat plate 51a or 51b. Portions of each oblique gutter type beams 52 connected to the flat surfaces are widened toward the ends, as shown in FIG. 7.

The interior of the vertical cooling plates 51 through which water 53 flows down is maintained in a high vacuum state. Porous surfaces 54 are formed on the inner walls of the vertical cooling plates 51 by copper spraying, as shown in FIG. 5B.

Figure 8A:
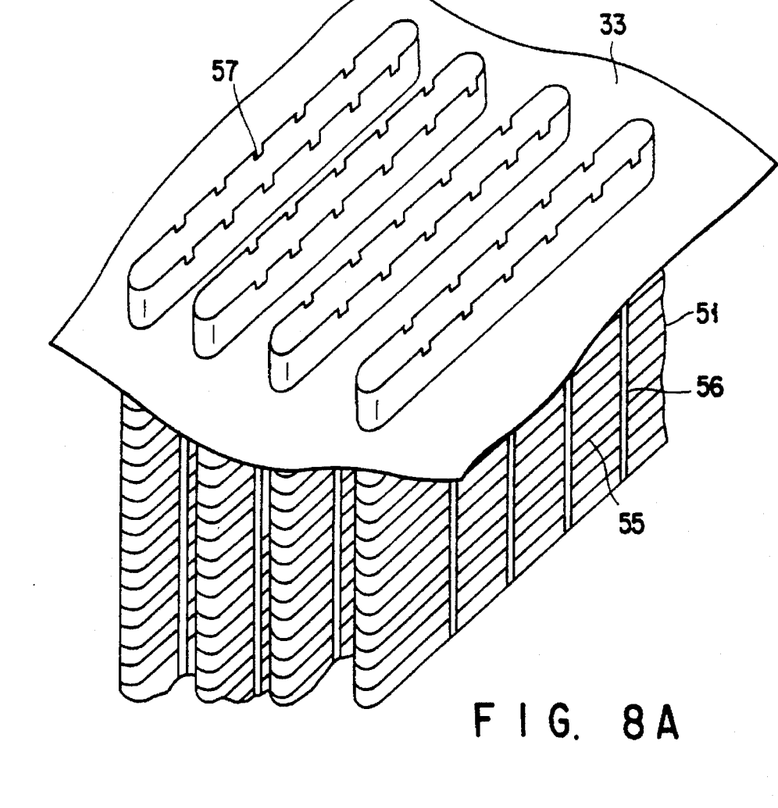
FIGS. 8A and 8B are views showing the arrangement of the upper portion of the vertical cooling plates of the gas turbine intake air cooling apparatus according to the second embodiment of the present invention.
Figure 8B:
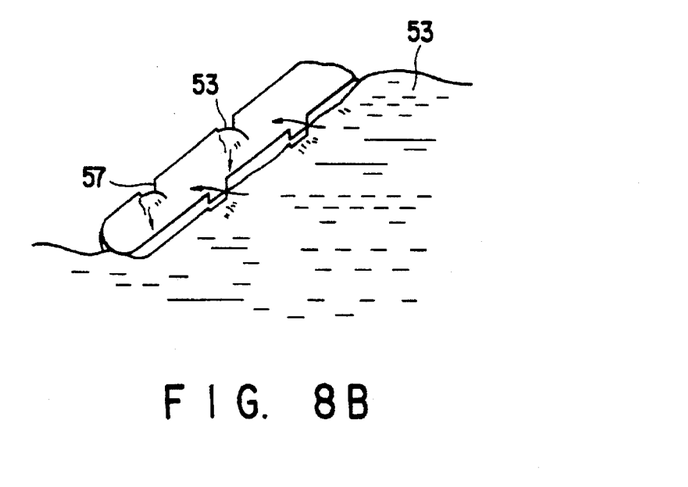

As shown in FIGS. 8A and 8b, grooves 55 are formed in the surfaces of the vertical cooling plates 51 in the horizontal direction, and vertical ribs 56 are fixed on the surfaces of the vertical cooling plates 51 in the vertical direction at predetermined gaps.

The vertical cooling plates 51 are fixed to project from the intake duct. Notched portions 57 are formed in the upper portions of the vertical cooling plates 51 so that the water 53 flows down along the inner walls of the vertical cooling plates 51. The amount of water 53 that flows down is kept constant by a float-type water level adjusting unit.

The operation of the gas turbine intake air cooling apparatus according to the second embodiment of the present invention that has the above arrangement will be described.

Water stored in the water tank 8 is pumped up by the pump 9 and supplied to the inlet port sides of the vertical cooling plates 51.

The pumped water flows down from the inlet ports of the vertical cooling plates 51 to form flowing water films within the vertical cooling plates 51 maintained in a high vacuum state.

The falling water is evaporated from the flowing water films, thereby cooling the gas turbine combustion air flowing in the channel. The water 53 flows down in the vertical cooling plates 51 as it alternately flows on the inner walls of the flat plates 51a and 51b that oppose each other through the gutter type beams 52.

Vapor generated by the vertical cooling plates 51 is absorbed by the aqueous lithium bromide solution which has been sprinkled by the sprinkler 11 and cooled through the horizontal heat transfer tube 12 through which seawater flows.

The aqueous lithium bromide solution that has absorbed water vapor is stored in a diluted aqueous lithium bromide solution tank 13.

The aqueous lithium bromide solution stored in the diluted aqueous lithium bromide solution tank 13 is supplied to a generator 16 by a pump 14.

Water vapor contained in the aqueous lithium bromide solution supplied to the generator 16 is evaporated, during the nighttime off-peak hours, by using the exhaust gas generated from the gas turbine 1.

Evaporated water vapor is condensed to water by a condenser 23 through which seawater flows, and the obtained water is stored in a water reservoir portion 24.

Water stored in the water reservoir portion 24 is supplied to the water tank 8 by a pump 25 (or a head (pressure difference)).

The condensed aqueous lithium bromide solution is cooled by a pre-cooler 28, supplied to the sprinkler 11 by a pump 27 during the daytime peak hours, and sprinkled.

Therefore, with the gas turbine intake air cooling apparatus of this embodiment, water is caused to flow down along and evaporate from the vertical cooling plates 51 in a high vacuum state. Thus, the intake air of the gas turbine can be cooled with a small heat transfer area and low pressure loss.

Each vertical cooling plate 51 is constituted by sandwiching, between the two flat plates 51a and 51b, the plurality of gutter type beams 52 that are inclined by 10×or more with respect to the flat surfaces of the flat plates 51a and 51b. The connecting portions of each gutter type beam 52 with the flat plates 51a and 51b are widened toward the ends. Thus, the water 53 can flow down in the vertical cooling plates 51 as it alternately flows on the inner walls of the flat plates 51a and 51b that oppose each other. This causes turbulence in the flowing liquid films formed on the inner walls of the vertical cooling plates 51, thereby improving the evaporation performance.

Since the porous surfaces 54 are formed by copper spraying on the inner walls of the flat plates 51a and 51b on which the water 53 flows down, the evaporation heat transfer characteristics can be improved.

Furthermore, the water content contained in air which is generated on the surfaces of the vertical cooling plates 51 when the gas turbine combustion air is cooled can be flowed in the horizontal direction along the grooves 55 and toward the water tank 8 by the vertical ribs 56. As a result, waterdrops can be prevented from flowing into the gas turbine.

As has been described above in detail, with the gas turbine air cooling apparatus according to the present invention, the pressure loss of the gas turbine combustion air can be decreased, and the cost and space can be decreased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A gas turbine intake air cooling apparatus comprising:

a plurality of heat transfer tubes, which are arranged midway along one of two channels which are branched and arranged between a gas turbine and an air supply source for supplying combustion air to said gas turbine and through which the combustion air of said gas turbine flows, to be perpendicular to said channel, through which water flows down from inlet ports thereof to form flowing water films, and in which flowing water is evaporated from the flowing water films, thereby cooling the combustion air of said gas turbine that flows in said channel;

an absorber, arranged above said heat transfer tubes, for absorbing water vapor generated in said heat transfer tubes by using an aqueous lithium bromide solution;

a water tank, provided to outlet port sides of said heat exchanger tubes, for storing water flowing from said heat transfer tubes;

pumping means for pumping water stored in said water tank up to said inlet port sides of said heat transfer tubes; and a generator for extracting the water vapor contained in the aqueous lithium bromide solution supplied from said absorber, condensing the extracted water vapor to water by a condenser through which cooling water flows, supplying the obtained water to said water tank, and supplying a condensed aqueous lithium bromide solution from which the water vapor has been removed to said absorber.

2. An apparatus according to claim 1, wherein the water vapor is extracted from the aqueous lithium bromide solution in said generator by using an exhaust gas extracted from a waste heat recovery exchanger of said gas turbine.

3. An apparatus according to claim 1, wherein seawater is used as the cooling water.

4. An apparatus according to claim 1, wherein the aqueous lithium bromide solution supplied to said absorber is pre-cooled by using seawater.

5. An apparatus according to claim 1, which further comprises:

steam generating heat transfer tubes which are set higher than a liquid level of the aqueous lithium bromide solution stored in said generator;

a circulating pump for supplying said aqueous lithium bromide stored in said generator to inlet port of said steam generating heat transfer tubes to form flowing liquid films in said steam generating heat transfer tubes; and evaporating means for evaporating said flowing liquid films.

6. An apparatus according to claim 1, wherein said heat transfer tubes are formed such that a sectional area of each heat transfer tube is gradually decreased from an upper inlet side thereof toward a lower outlet side thereof.

* * * * *